US005297903A

United States Patent [19]
Hilton

[11] Patent Number: 5,297,903
[45] Date of Patent: Mar. 29, 1994

[54] POLYGONAL MORTISING DRILL TOOL ARRANGEMENT

[76] Inventor: Gordon K. Hilton, 721 W. Person #5, Phoenix, Ariz. 85013

[21] Appl. No.: 14,751

[22] Filed: Feb. 8, 1993

[51] Int. Cl.$^5$ .............................................. B23B 51/08
[52] U.S. Cl. ........................................ 408/30; 144/78
[58] Field of Search ....................... 408/14, 22, 24, 30, 408/97; 144/74, 78, 79

[56] References Cited

U.S. PATENT DOCUMENTS

| | | | |
|---|---|---|---|
| 1,683,763 | 9/1928 | de Walt | 144/78 |
| 2,334,830 | 11/1943 | Mansfield | 144/78 |
| 2,622,638 | 12/1952 | Sanders | 144/78 |
| 2,821,218 | 1/1958 | Hultquist | 408/30 |

FOREIGN PATENT DOCUMENTS 734442 8/1955 United Kingdom ................. 144/78

Primary Examiner—Daniel W. Howell
Attorney, Agent, or Firm—Leon Gilden

[57] ABSTRACT

A mortising device directed to project a polygonal bore within a workpiece is provided to include a parallelepiped guide tube having a drill bit rotatably mounted therewithin, with the guide tube having window slots arranged throughout alternating walls of the guide tube, with intermediate walls of the guide tube intermediate the alternating walls containing the drill bit in an aligned relationship, with a lowermost end of the guide tube having a continuous chisel edge for projection into an underlying workpiece to effect formation of the polygonal hole structure.

6 Claims, 4 Drawing Sheets

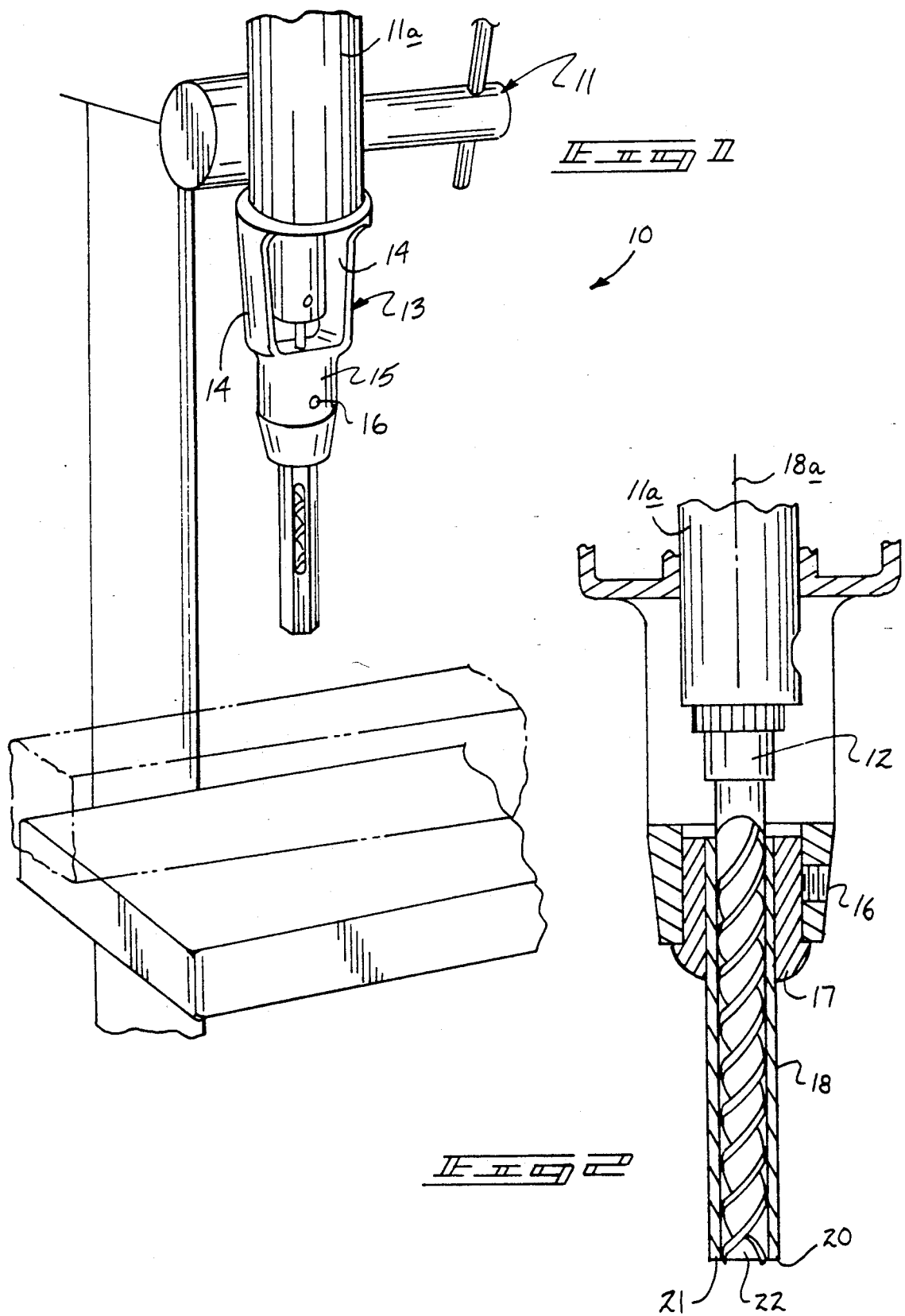

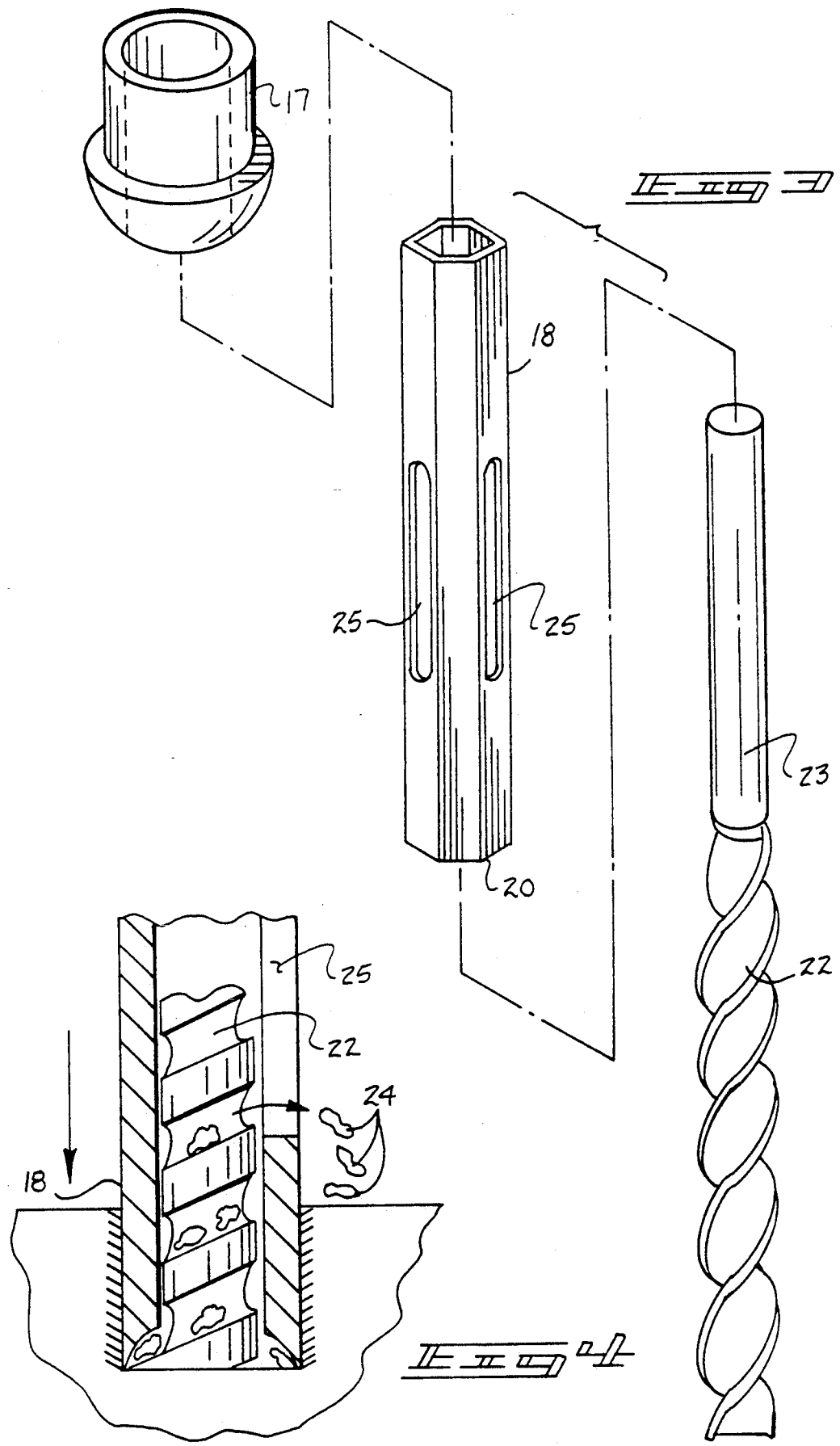

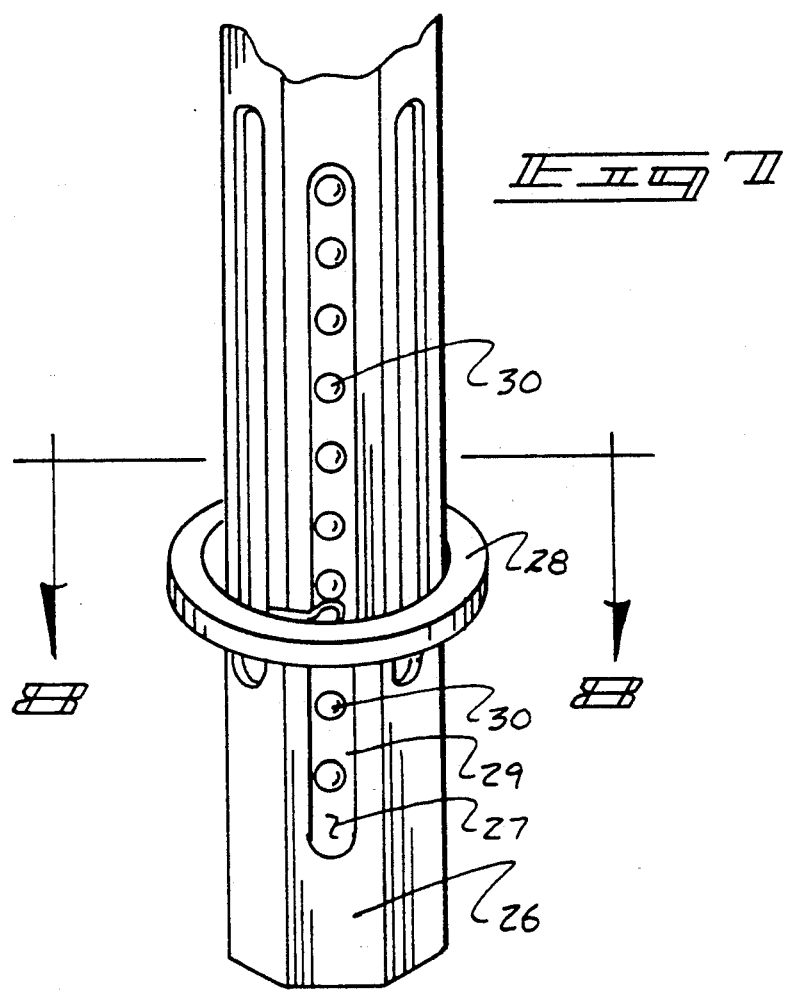
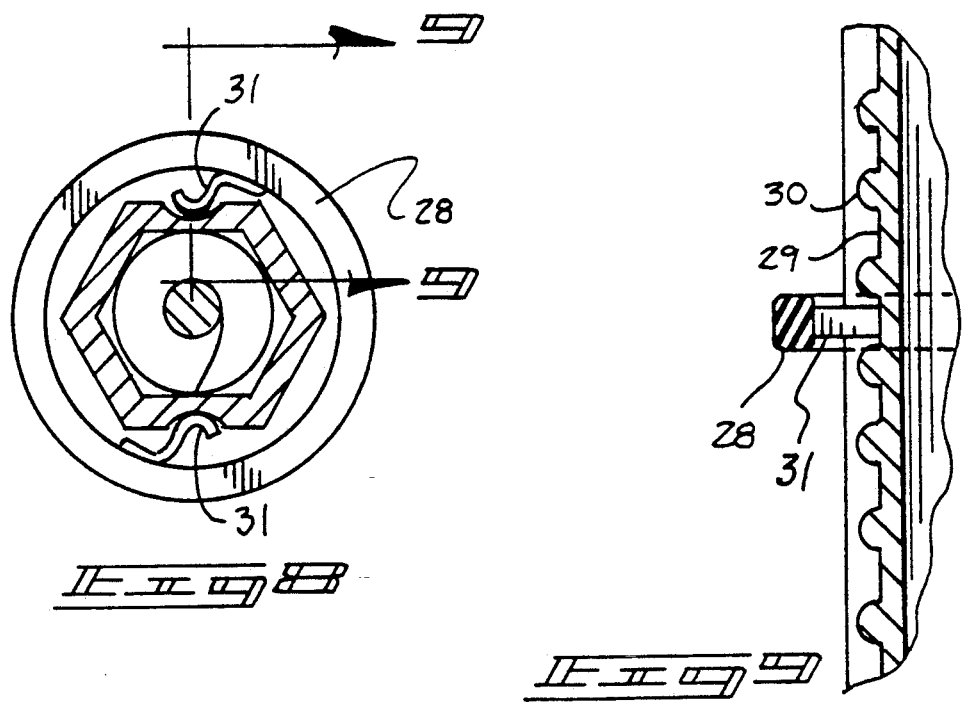

POLYGONAL MORTISING DRILL TOOL ARRANGEMENT

BACKGROUND OF THE INVENTION

1. Field of the Invention

The field of invention relates to mortising tools, and more particularly pertains to a new and improved polygonal mortising drill tool arrangement wherein the same is directed to project polygonal bores within an associated workpiece.

2. Description of the Prior Art

Mortising tool structure of various types have been utilized throughout the prior art and indicated by the U.S. Pat. Nos. 3,850,211; 4,358,975; 4,223,708; 3,639,982; and 5,067,858.

The instant invention attempts to overcome an improved structure of the prior art by providing for the use of a guide tool structure having chip directing windows directed therethrough in a compact unitary organization to effect the projection of polygonal bores within a workpiece and in this respect, the present invention substantially fulfills this need.

SUMMARY OF THE INVENTION

In view of the foregoing disadvantages inherent in the known types of mortising tool apparatus now present in the prior art, the present invention provides a polygonal mortising drill tool arrangement wherein the same includes a polygonal guide tool to effect projection of polygonal bores within an underlying workpiece. As such, the general purpose of the present invention, which will be described subsequently in greater detail, is to provide a new and improved polygonal mortising drill tool arrangement which has all the advantages of the prior art mortising tool apparatus and none of the disadvantages.

To attain this, the present invention provides a mortising device directed to project a polygonal bore within a workpiece, to include a parallelepiped guide tube having a drill bit rotatably mounted therewithin, with the guide tube having window slots arranged throughout alternating walls of the guide tube, with intermediate walls of the guide tube intermediate the alternating walls containing the drill bit in an aligned reltaionship, with a lowermost end of the guide tube having a continuous chisel edge for projection into an underlying workpiece to effect formation of the polygonal hole structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved polygonal mortising drill tool arrangement which has all the advantages of the prior art mortising tool apparatus and none of the disadvantages.

It is another object of the present invention to provide a new and improved polygonal mortising drill tool arrangement which may be easily and efficiently manufactured and marketed.

It is a further object of the present invention to provide a new and improved polygonal mortising drill tool arrangement which is of a durable and reliable construction.

An even further object of the present invention is to provide a new and improved polygonal mortising drill tool arrangement which is susceptible of a low cost of manufacture with regard to both materials and labor, and which accordingly is then susceptible of low prices of sale to the consuming public, thereby making such polygonal mortising drill tool arrangements economically available to the buying public.

Still yet another object of the present invention is to provide a new and improved polygonal mortising drill tool arrangement which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention.

FIG. 2 is an orthographic cross-sectional illustration of the guide tube and drill head structure of the invention.

FIG. 3 is an isometric exploded view of the guide tube arrangement of the invention.

FIG. 4 is an orthographic cross-sectional illustration of the guide tube structure in cooperation with an underlying workpiece.

FIG. 7 is an isometric enlarged view of the adjustment ring employing fixed stops.

FIG. 8 is an orthographic view, taken along the lines 8—8 of FIG. 7 in the direction indicated by the arrows.

FIG. 9 is an orthographic view, taken along the lines 9—9 of FIG. 8 in the direction indicated by the arrows.

DESCRIPTION OF THE PREFERRED EMBODIMENT

Figure 5:
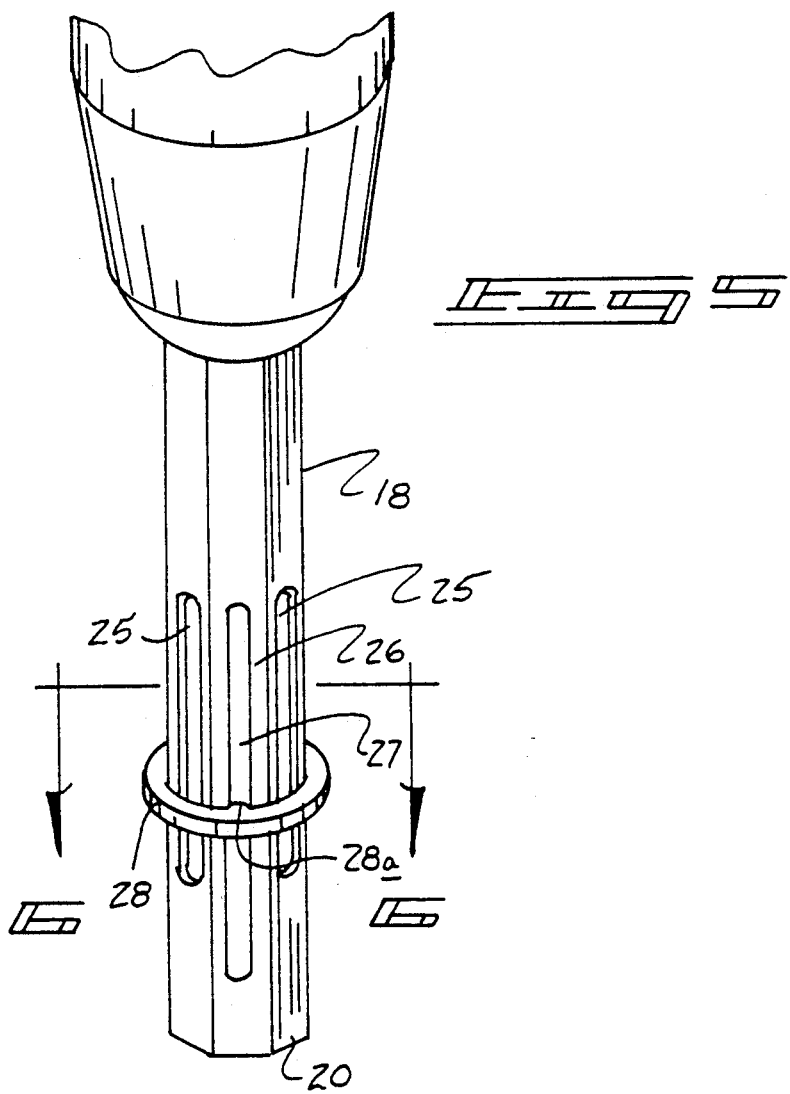
FIG. 5 is an isometric illustration of the invention employing an abutment ring functioning as a depth gauge.
Figure 6:
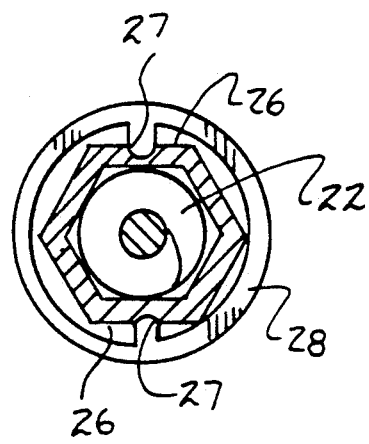
FIG. 6 is an orthographic view, taken along the lines 6—6 of FIG. 5 in the direction indicated by the arrows.

With reference now to the drawings, and in particular to FIGS. 1 to 9 thereof, a new and improved polygonal mortising drill tool arrangement embodying the principles and concepts of the present invention and generally designated by the reference numeral 10 will be described.

More specifically, the polygonal mortising drill tool arrangement 10 of the instant invention essentially comprises a drill press assembly 11 having a stationary drill press head 11a, with a drill chuck 12 rotatably mounted to the drill press head 11a. A collar head 13 is fixedly mounted to the drill press head, with the collar head 13 having spaced flanges 14 oriented on diametrically opposed sides of the drill press head 11 projecting below the drill press head and on diametrically opposed sides of the drill chuck 12, with the spaced flanges 14 having a cylindrical support head 15 mounted to the support flanges 14 coaxially aligned with the drill chuck 12 orienting the drill chuck 12 between the cylindrical support head 15 and the drill press head 11a. The cylindrical support head 15 has secured coaxially therewithin an alignment bushing 17 coaxially aligned with the drill chuck 12, with the alignment bushing removably mounted relative to the cylindrical support head 15 by a fastener 16 radially directed through the support head 15 into engagement with the alignment bushing 17. The alignment bushing 17 mounts a polygonal guide tube 18 coaxially of the alignment bushing 17 and of the drill chuck 12, with the polygonal guide tube 18 of a parallelepiped configuration having a tube first end 19 fixedly mounted within the bushing 17 and a second end 20 spaced from the first end, with the second end having a continuous polygonal cutting edge 21 for projection into an underlying workpiece, such as indicated in FIGS. 2 and 4. A drill bit 22 having a shank 23 is mounted within the drill chuck 12 and rotatably mounted and contained complementarily within the guide tube 18. The guide tube 18 further includes alternating sides 18, each having a window opening 25, with the window openings 25 oriented parallel to the axis 18a of the guide tube 18. In this manner, workpiece chips 24 (see FIG. 4) directed from the workpiece extend along the flutes of the drill bit 22 and project from the guide tube 18 through the window openings 25. Intermediate guide tube walls 26 are oriented intermediate the alternating sides of the guide tube, wherein a plurality of opposed parallel intermediate guide tube walls 26 include groove members 27 that are parallel and coextensive relative to one another, as indicated in the construction of the invention as indicated in FIG. 5. The groove members 27 mount an abutment ring 28, with the abutment ring 28 having guide fingers 28a received within a respective groove member 27.

The abutment ring 28, as indicated in the construction of FIG. 7, in lieu of the guide fingers 28a, employ spring finger detents 31. Each groove member 27 includes a groove floor 29, with the groove floor 29 including spaced ribs 30, with the spring finger detents 31 arranged for reception between adjacent spaced ribs 30 within each of the grooves fixedly mounted onto the respective groove floor 29. In this manner, the abutment ring 28 functions as a depth guide for limiting depth of projection of the second end 20 within the workpiece.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A polygonal mortising drill tool arrangement, comprising, a drill press assembly, having a stationary drill press head, and a drill chuck rotatably mounted relative to the drill press head, with a drill bit mounted within the drill chuck coaxially aligned relative to the drill chuck and the drill press head, and a collar head fixedly mounted to the drill press head, the collar head including spaced flanges mounted to the drill press head extending below the drill press head terminating in a support head, with the support head coaxially aligned with the drill press head and the drill chuck, with the support head mounting a polygonal guide tube, with the drill rotatably and complementarily mounted within the guide tube.

2. A drill tool arrangement as set forth in claim 1 wherein the cylindrical support head includes an alignment bushing, having an alignment bushing bore, with the alignment bushing bore receiving a polygonal guide tube, and a fastener member directed through the support head in engagement with the alignment bushing for securement of the alignment bushing within the support head.

3. A drill tool arrangement as set forth in claim 2 wherein the polygonal guide tube is of a parallelepiped configuration, having a first end fixedly mounted within the alignment bushing, and a second end spaced from the first end, with the second end having a continuous polygonal cutting edge, with the guide tube, the drill press head, and the drill bit coaxially aligned about a predetermined axis, with the cutting edge symmetrically oriented about said axis.

4. A drill tool arrangement as set forth in claim 3 wherein the guide tube includes first sides and intermediate sides, with the first sides and the intermediate sides arranged in adjacency relative to one another, with the intermediate sides oriented between adjacent alternating sides, and a plurality of the alternating sides having elongate windows directed therethrough, with the windows arranged parallel relative to the axis, and the windows are oriented intermediate the first end and the second end.

5. A drill tool arrangement as set forth in claim 4 wherein a plurality of intermediate walls include a groove member, wherein a plurality of such groove members are provided arranged in a parallel coextensive relationship on diametrically opposed sides of the guide tube, with each groove member having a groove floor, with an abutment ring mounted about the guide tube, with the abutment ring including a plurality of detents, with one of said detents received within one of the grooves and in engagement with the groove floor.

6. A drill tool arrangement as set forth in claim 5 wherein each groove floor includes a row of spaced ribs, and the detents are of a spring construction in biased engagement onto the groove floor between adjacent ribs of each elongate groove.

* * * * *